United States Patent
Amano (10) Patent No.: US 9,772,477 B2
(45) Date of Patent: Sep. 26, 2017

(54) PROJECTION ZOOM LENS AND PROJECTION TYPE DISPLAY DEVICE

(71) Applicant: FUJIFILM Corporation, Tokyo (JP)

(72) Inventor: Masaru Amano, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 245 days.

(21) Appl. No.: 14/855,407

(22) Filed: Sep. 16, 2015

(65) Prior Publication Data
US 2016/0085060 A1    Mar. 24, 2016

(30) Foreign Application Priority Data
Sep. 18, 2014    (JP) .................................. 2014-189886

(51) Int. Cl.
*G02B 15/177*    (2006.01)
(52) U.S. Cl.
CPC .................................. *G02B 15/177* (2013.01)
(58) Field of Classification Search
CPC .................................................. G02B 15/177
See application file for complete search history.

(56) References Cited

U.S. PATENT DOCUMENTS

| 6,515,803 B2 * | 2/2003 | Hirose ................. G02B 15/177 359/649 |
| 2009/0257129 A1 | 10/2009 | Kawana |

FOREIGN PATENT DOCUMENTS

| JP | 5081045 | 9/2012 |
| JP | 5397562 | 11/2013 |

* cited by examiner

*Primary Examiner* — Joseph P Martinez
(74) *Attorney, Agent, or Firm* — Young & Thompson (57) ABSTRACT

A projection zoom lens is constituted essentially by: a plurality of lens groups that include at least two lens groups that move when changing magnification; the distances among all pairs of adjacent lens groups changing when changing magnification; the reduction side being configured to be telecentric; and a negative first lens group, which is fixed when changing magnification, being provided most toward the magnification side. The first lens group is constituted essentially by, in order from the magnification side to the reduction side, a negative first lens, which is a meniscus lens having a convex surface toward the magnification side, a biconcave second lens, and a positive or negative third lens. Conditional Formula (1) related to fw, which is the focal length of the entire projection zoom lens at the wide angle end, and f3, which is the focal length of the third lens, is satisfied:

$$-0.070 < fw/f3 < 0.070 \qquad (1).$$

12 Claims, 7 Drawing Sheets

EXAMPLE 1

FIG.1  EXAMPLE 1

WIDE

TELE

FIG.2

EXAMPLE 2

WIDE

TELE

FIG.3  EXAMPLE 3

WIDE

TELE

FIG.4

EXAMPLE 1

FIG.5

EXAMPLE 2

FIG.6  EXAMPLE 3

FIG.7

PROJECTION ZOOM LENS AND PROJECTION TYPE DISPLAY DEVICE

CROSS REFERENCE TO RELATED APPLICATIONS

The present application claims priority under 35 U.S.C. §119 to Japanese Patent Application No. 2014-189886 filed on Sep. 18, 2014. The above application is hereby expressly incorporated by reference, in its entirety, into the present application.

BACKGROUND

The present disclosure is related to a projection zoom lens and a projection type display device. The present disclosure is related to a projection zoom lens which is suited to magnify and project original images which are formed by light valves onto a screen, for example, and a projection type display device equipped with such a projection zoom lens.

Conventionally, projection type display devices that utilize light valves, such as liquid crystal display elements, DMD's (Digital Micromirror Devices: registered trademark), etc., are in wide use. Particularly, projection type display devices of configurations that employ three light valves, each corresponding to illuminating light beams of the three primary colors, red, green, and blue, combine light beams which are modulated by each of the light valves with a prism or the like, and display images on screens via a projection lens, are in wide use.

It is necessary for projection lenses, which are utilized in projection type display devices that combine light beams modulated by three light valves with a color combining optical system, to have a long back focus in order to provide the aforementioned prism or the like that combines colors, and also to avoid problems related to heat. Further, the spectral properties of color combining prisms change according to the incident angles of light beams that enter thereinto. Therefore, it is necessary for projection lenses to be configured such that the entrance pupils thereof are sufficiently distantly positioned when the reduction side is the light incident side. That is, it is necessary for the projection lenses to have telecentric properties at the reduction side.

Known projection zoom lenses that satisfy the above demands to a certain degree are disclosed in Japanese Patent Nos. 5397562 and 5081045. Japanese Patent No. 5397562 discloses a projection zoom lens having a five group configuration, among which three lens groups move while changing magnification. Japanese Patent No. 5081045 discloses a projection zoom lens having a five group configuration, in which a first lens group provided most toward the magnification side is constituted by two lenses.

SUMMARY

Meanwhile, due to recent increases in the fineness of the resolutions of light valves, there is demand for projection lenses to have high performance by favorably correcting aberrations to be compatible with such light valves. In addition, there is greater demand for miniaturization, due to increased opportunities for mobile usage. Further, there is demand for projection lenses to be lens systems having small F numbers.

However, the lens systems disclosed in Japanese Patent Nos. 5397562 and 5081045 have large amounts of astigmatism, and it is desirable for aberrations to be further corrected when considering use with fine resolution light valves which have recently been developed.

The present disclosure has been developed in view of the foregoing circumstances. The present disclosure provides a compact projection zoom lens, which is an optical system having a small F number, that favorably corrects various aberrations and has high projection performance. In addition, the present disclosure provides a projection type display device equipped with such a projection zoom lens.

A projection zoom lens of the present disclosure consists essentially of a plurality of lens groups that include at least two lens groups that move when changing magnification;

the distances among all pairs of adjacent lens groups changing when changing magnification;

the reduction side being configured to be telecentric;

a first lens group, which has a negative refractive power and is fixed when changing magnification, being provided most toward the magnification side;

the first lens group consisting essentially of, in order from the magnification side to the reduction side, a first lens, which is a meniscus lens having a negative refractive power and a convex surface toward the magnification side, a second lens, which is a biconcave lens, and a third lens having one of a positive refractive power and a negative refractive power; and Conditional Formula (1) below being satisfied:

$$-0.070 < fw/f3 < 0.070 \qquad (1)$$

wherein fw is the focal length of the entire projection zoom lens at the wide angle end, and f3 is the focal length of the third lens.

It is preferable for the projection zoom lens of the present disclosure to satisfy one or arbitrary combinations of Conditional Formulae (2) through (4), (1-1), and (2-1) below.

$$-0.050 < fw/f3 < 0.050 \qquad (1\text{-}1)$$

$$-12.0 < fA/fw < -2.0 \qquad (2)$$

$$-10.0 < fA/fw < -3.0 \qquad (2\text{-}1)$$

$$65.0 < vd2 < 96.0 \qquad (3)$$

$$1.0 < Bf/fw < 2.0 \qquad (4)$$

wherein fw is the focal length of the entire projection zoom lens at the wide angle end, f3 is the focal length of the third lens, fA is the focal length of an air lens formed by the lens surface of the second lens toward the reduction side and the lens surface of the third lens toward the magnification side, vd2 is the Abbe's number of the second lens with respect to the d line, and Bf is the back focus of the entire projection zoom lens at the wide angle end in the case that the reduction side is designated as the back side, as an air converted length.

The projection zoom lens of the present disclosure may be of a configuration consisting essentially of five lens groups, which are, in order from the magnification side to the reduction side, a first lens group, a second lens group, a third lens group, a fourth lens group, and a fifth lens group, among which the second lens group, the third lens group, and the fourth lens group move when changing magnification, while the fifth lens group is fixed.

In the case that the projection zoom lens of the present disclosure is of the five group configuration described above, each of the second lens group, the third lens group, the fourth lens group, and the fifth lens group may be configured to have positive refractive powers.

In the case that the projection zoom lens of the present disclosure is of the five group configuration described above, and each of the second lens group, the third lens group, the fourth lens group, and the fifth lens group are configured to have positive refractive powers, it is preferable for at least one or both of Conditional Formulae (5) and (6) below to be satisfied.

$$2.0 < fG3/fw < 4.5 \quad (5)$$

$$1.5 < fG5/fw < 4.0 \quad (6)$$

wherein fw is the focal length of the entire projection zoom lens at the wide angle end, fG3 is the focal length of the third lens group, and fG5 is the focal length of the fifth lens group.

In the case that the projection zoom lens of the present disclosure is of the five group configuration described above, it is preferable for the lens provided most toward the magnification side within the fourth lens group to have a negative refractive power, and for Conditional Formula (7) below to be satisfied.

$$1.0 < (R41f + R41r)/(R41f - R41r) < 4.0 \quad (7)$$

wherein R41f is the paraxial radius of curvature of the surface toward the magnification side of the lens provided most toward the magnification side within the fourth lens group, and R41r is the paraxial radius of curvature of the surface toward the reduction side of the lens provided most toward the magnification side within the fourth lens group.

A projection type display device of the present disclosure comprises:

a light source;

a light valve into which light from the light source enters; and a projection zoom lens of the present disclosure described above as a projection zoom lens that projects an optical image formed by light, which is optically modulated by the light valve, onto a screen.

Note that the "magnification side" refers to the side toward which images are projected (toward a screen), and the side toward the screen will be referred to as the magnification side even when reduced projection is performed for the sake of convenience. Meanwhile, the "reduction side" refers to the side toward an original image display region (toward the light valves), and the side toward the light valves will be referred to as the reduction side even when reduced projection is performed for the sake of convenience.

Note that the term "essentially" in the phrases "consists essentially of . . . " and "consisting essentially of . . . " above means that the projection zoom lens may include other constituted elements other than those listed above, such as lenses that substantially do not have any power, optical elements other than lenses such as a stop and a cover glass, and mechanical components such as lens flanges, a lens barrel, and a camera shake correcting mechanism.

Note that the phrase "lens group" above does not necessarily refer to those constituted by a plurality of lenses, and may include those which are constituted by a single lens.

Note that the signs of the refractive powers of the above lens groups, the signs of the refractive powers of the lenses, and the shapes of the lenses will be considered in the paraxial region for lenses that include aspherical surfaces, unless particularly noted otherwise.

According to the present disclosure, the lens configuration of the first lens group is favorably set in a zoom lens system consisting essentially of a plurality of lens groups that include at least two lens groups that move when changing magnification, and a predetermined conditional formula is satisfied. Therefore, a compact projection zoom lens, which is an optical system having a small F number, that favorably corrects various aberrations and has high projection performance, as well as a projection type display device equipped with this projection zoom lens, can be realized.

DETAILED DESCRIPTION OF THE PREFERRED EMBODIMENTS

Figure 1:
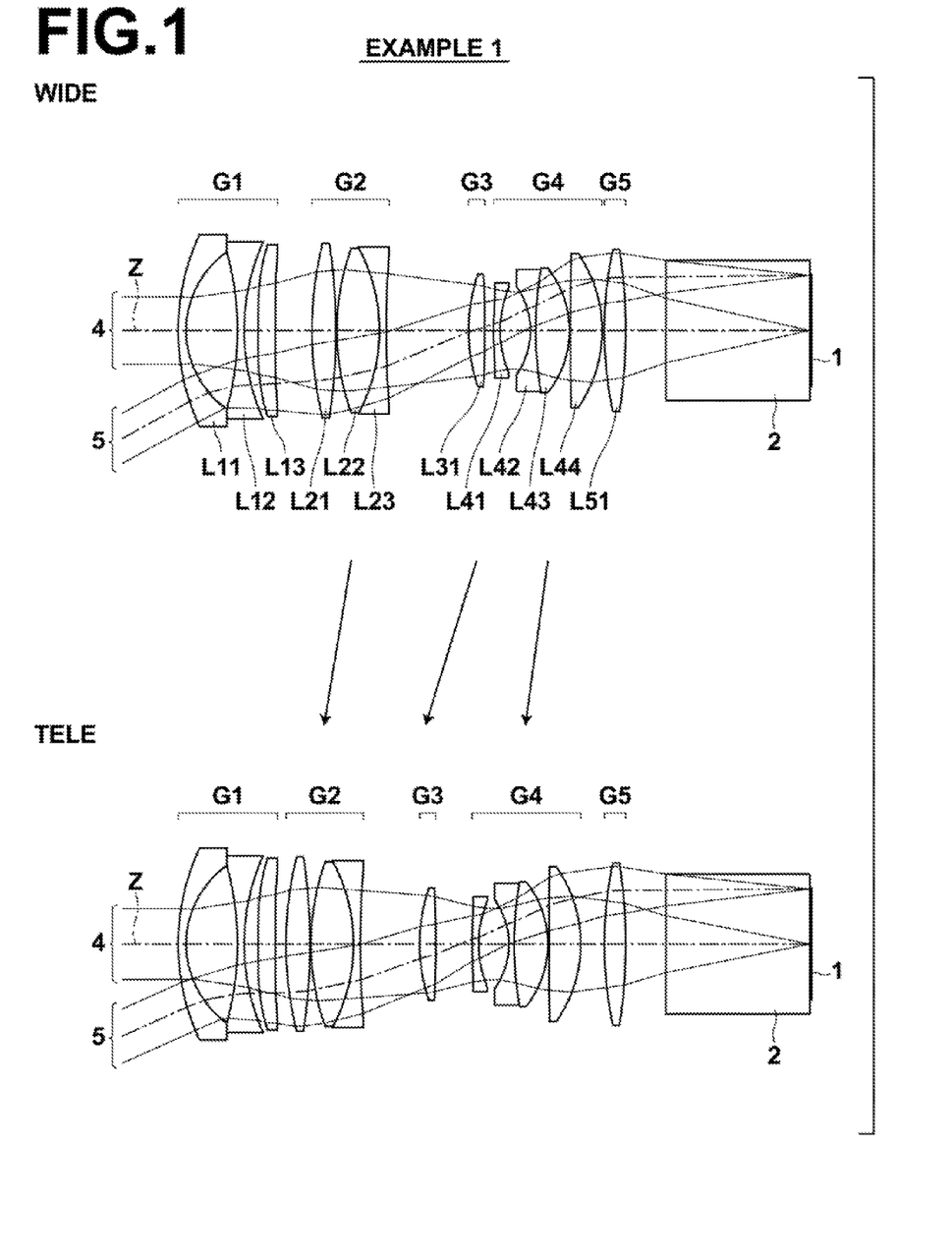
FIG. 1 is a collection of sectional diagrams that illustrate the lens configuration of and the trajectories of light beams through a projection zoom lens according to Example 1 of the present disclosure.
Figure 2:
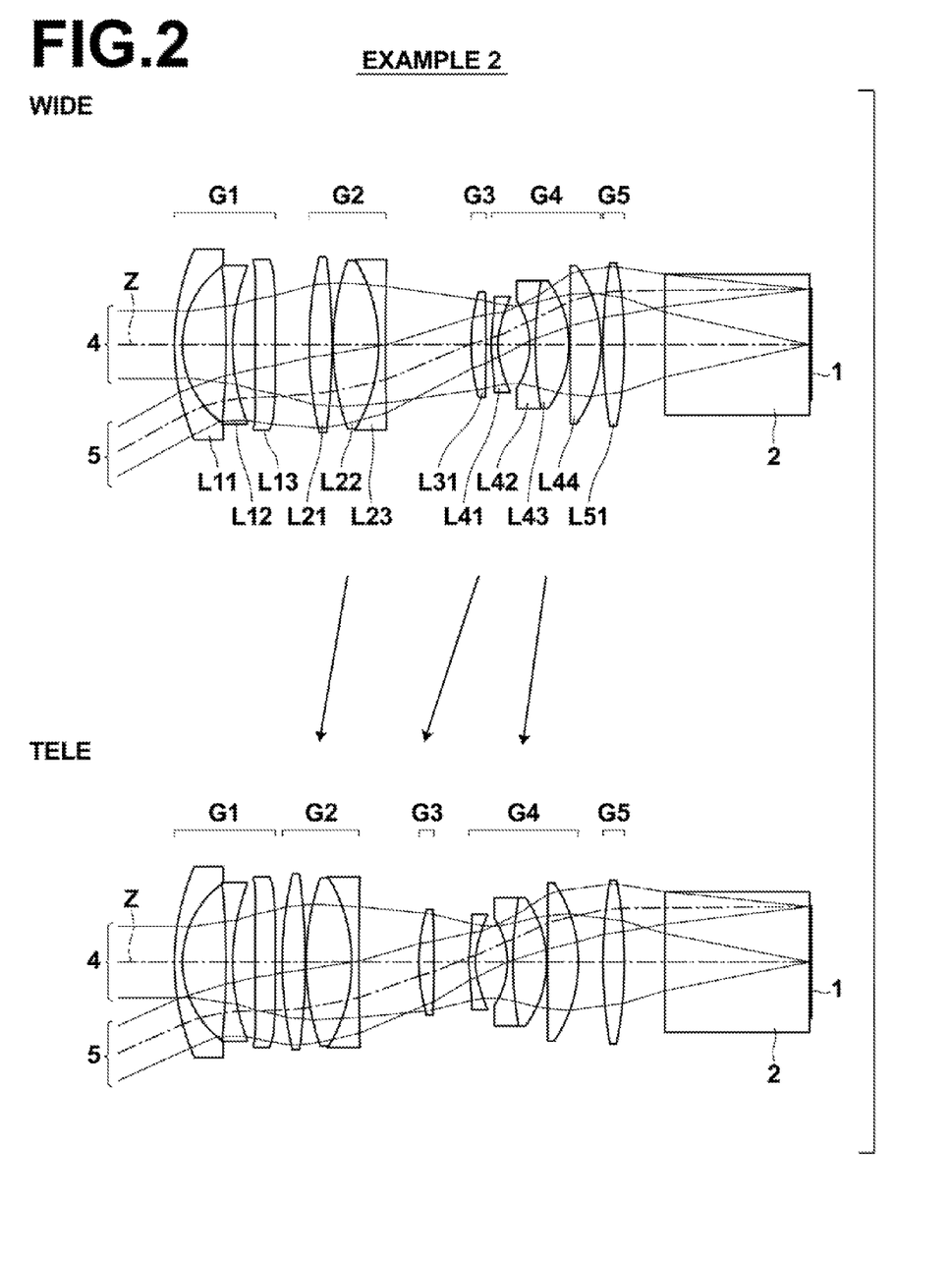
FIG. 2 is a collection of sectional diagrams that illustrate the lens configuration of and the trajectories of light beams through a projection zoom lens according to Example 2 of the present disclosure.
Figure 3:
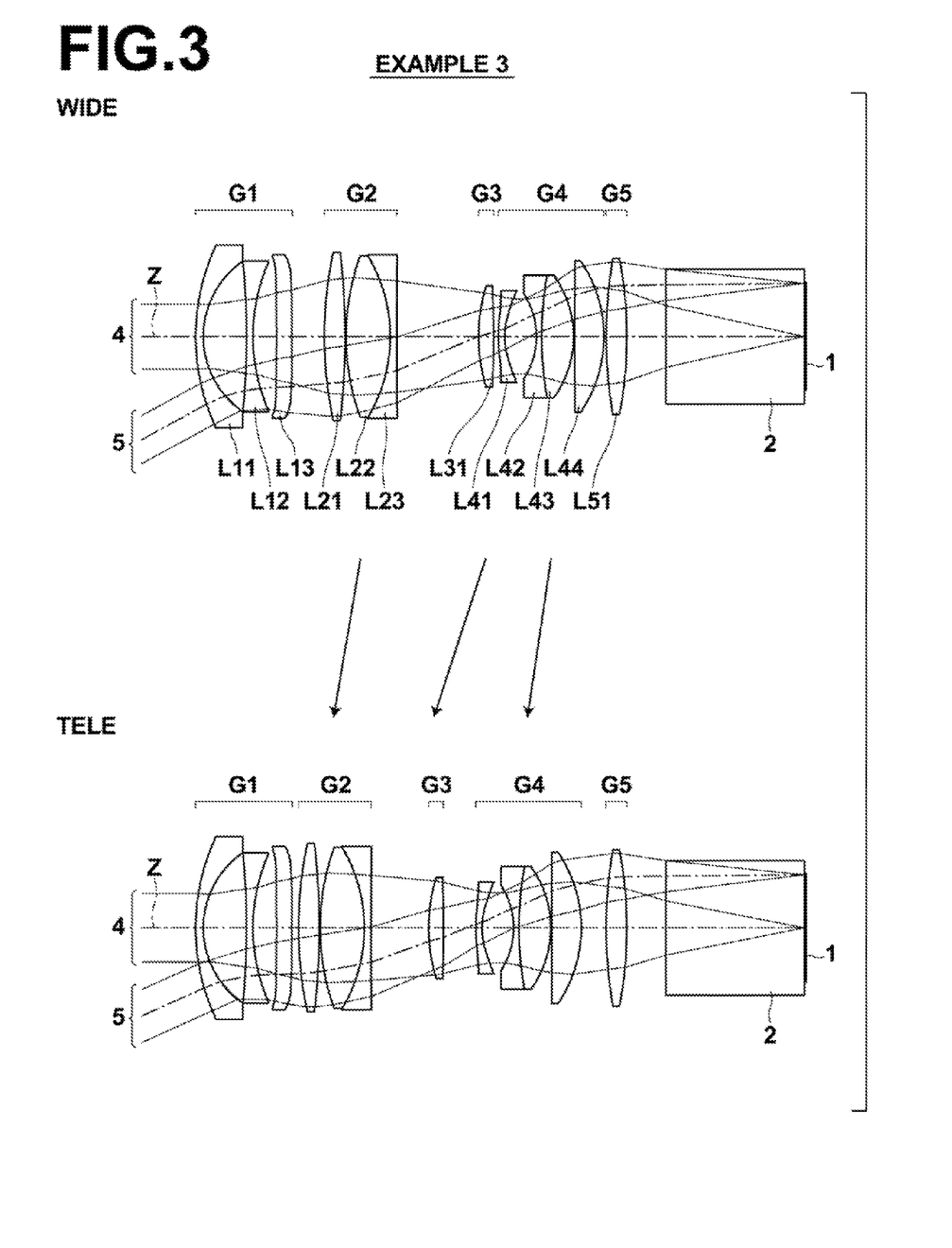
FIG. 3 is a collection of sectional diagrams that illustrate the lens configuration of and the trajectories of light beams through a projection zoom lens according to Example 3 of the present disclosure.

Hereinafter, embodiments of the present disclosure will be described in detail with reference to the accompanying drawings. FIG. 1 through FIG. 3 are collections of sectional diagrams that illustrate the lens configurations of and the optical paths of axial light beams 4 and light beams 5 at a maximum image height through projection zoom lenses according to embodiments of the present disclosure, which respectively correspond to projection zoom lenses according to Examples 1 through 3 to be described later. The basic configurations of the examples illustrated in FIG. 1 through FIG. 3 and the manners in which FIG. 1 through FIG. 3 are illustrated are basically the same. Therefore, the projection zoom lenses of the embodiments of the present disclosure will be described mainly with reference to FIG. 1.

In FIG. 1, the left side of the drawing sheet is the magnification side, and the right side of the drawing sheet is the reduction side. The upper portion of FIG. 1 labeled "WIDE" illustrates the state of the projection zoom lens at the wide angle end, and the lower portion of FIG. 1 labeled "TELE" illustrates the state of the projection zoom lens at the telephoto end. Arrows that schematically indicate the directions of movement of each lens group as magnification is changed from the wide angle end to the telephoto end are illustrated between the upper portion and the lower portion of FIG. 1.

This projection zoom lens is capable of being utilized as a projection zoom lens which is mounted on a projection type display device, for example, and projects image information displayed on a light valve onto a screen. Presuming a case in which the projection zoom lens is mounted on a projection type display device, a glass block 2, which functions as a prism, various filters, a cover glass, etc., and an image display surface 1 of a light valve, positioned at the surface of the glass block 2 toward the reduction side, are also illustrated in FIG. 1.

In the projection type display device, light beams, to which the image information is imparted by the image display surface 1, enter the projection zoom lens via the glass block 2. The projection zoom lens projects the beams onto a screen (not shown) disposed toward the left side direction of the drawing sheet.

Note that although FIG. 1 illustrates an example in which the position of the surface of the glass block 2 toward the reduction side and the position of the image display surface 1 are the same, the projection zoom lens of the present disclosure is not limited to such a configuration. In addition, FIG. 1 illustrates only one image display surface 1. However, the projection type display device may be configured to separate beams from a light source into three primary colors with a color separating optical system. In this case, three light valves that respectively correspond to the three primary colors may be provided, to enable display of full color images.

The projection zoom lens of the present embodiment consists essentially of a plurality of lens groups that include at least two lens groups that move when changing magnification. The distances between all adjacent pairs of lens groups change when changing magnification, and the reduction side is configured to be telecentric.

Note that the expression "the reduction side is telecentric" means that an angular line that bisects the cross section of a light beam focused at an arbitrary point on an image surface at the reduction side between the maximum ray of light at the upper side and the maximum ray of light at the lower side thereof is close to being parallel with the optical axis Z. The expression "the reduction side is telecentric" is not limited to cases in which the reduction side is completely telecentric, that is, cases in which the bisecting angular line is completely parallel to the optical axis Z, but also refers to cases in which a certain degree of error is present. Here, the certain degree of error refers to a range of inclination between the bisecting angular line and the optical axis Z from −3° to +3°.

The projection zoom lens of example illustrated in FIG. 1 consists essentially of five lens groups, which are, in order from the magnification side to the reduction side, a first lens group G1, a second lens group G2, a third lens group G3, a fourth lens group G4, and a fifth lens group G5. The first lens group G1 and the fifth lens group G5 are fixed when changing magnification, while the three other lens groups, which are the second lens group G2 through the fourth lens group G4, move when changing magnification. More specifically, in the example illustrated in FIG. 1, the three lens groups, which are the second lens group G2 through the fourth lens group G4, all move constantly toward the magnification side when changing magnification from the wide angle end to the telephoto end.

In the present disclosure, the number of lens groups that constitute the projection zoom lens and the movements of the lens groups other than the first lens group G1 are not necessarily limited to those of the example illustrated in FIG. 1. However, configuring the projection zoom lens to have five lens groups is advantageous from the viewpoint of improving performance. In addition, in the case that the first lens group G1 and the lens group most toward the reduction side are fixed when changing magnification, the total length of the lens system can be maintained constant when changing magnification, which is preferable as a configuration to be mounted on a projection type display device. Configuring the projection zoom lens such that the number of lens groups that move when changing magnification is three is advantageous from the viewpoint of suppressing fluctuations in aberrations when changing magnification.

In the projection zoom lens of the present embodiment, the first lens group G1 provided most toward the magnification side is a lens group having a negative refractive power. In the case that the projection zoom lens is of a five group configuration, each of the second lens group G2, the third lens group G3, the fourth lens group G4, and the fifth lens group G5 may be configured to have a positive refractive power. Adopting a power arrangement which is negative, positive, positive, positive, and positive in order from the magnification side in this manner is advantageous from the viewpoint of widening the angle of view, securing telecentric properties, and securing a back focus sufficiently long to insert a color combining prism or the like between the lens system and the image display surface 1.

In the projection zoom lens of the present embodiment, the first lens group G1 consists essentially of, in order from the magnification side to the reduction side, a first lens L11, which is a meniscus lens having a negative refractive power and a convex surface toward the magnification side, a second lens L12, which is a biconcave lens, and a third lens L13 having one of a positive refractive power and a negative refractive power. The projection zoom lens is configured to satisfy Conditional Formula (1) below.

$$-0.070 < fw/f3 < 0.070 \qquad (1)$$

wherein fw is the focal length of the entire projection zoom lens at the wide angle end, and f3 is the focal length of the third lens.

Achieving high performance is facilitated if the number of lenses is greater, because the degree of freedom in design increases. However, if the number of lenses within the first lens group G1 is great, the diameter of the lens system may increase, and the total length of the lens system may increase in order to secure space. Therefore, configuring the first lens group G1 with a great number of lenses, which may lead to an increase in the size of the lens system, is not preferable from the viewpoint of miniaturization. It is desirable for the first lens group G1 to be of a three lens configuration in order to achieve both miniaturization and an improvement in performance.

Distortion can be favorably corrected by providing the meniscus lens having a negative refractive power as the first lens L11. The first lens group G1 as a whole can have a strong negative refractive power by providing the biconcave lens as the second lens L12. As a result, it will become possible to favorably correct field curvature, which is an off axis aberration. The third lens L13 may be either a negative lens or a positive lens. The third lens L13 illustrated in the example of FIG. 1 is an aspherical lens, and is of a biconvex shape in the paraxial region. Alternatively, the third lens L13 may be of a meniscus shape in the paraxial region as in the Examples to be described later. Note that the refractive power of the third lens L13 is set such that Conditional Formula (1) is satisfied.

Conditional Formula (1) defines the ratio between the focal length of the entire projection zoom lens and the focal length of the third lens L13. In the case that the third lens L13 is a negative lens, the negative refractive power of the third lens L13 can be prevented from becoming excessively strong by configuring the projection zoom lens such that the value of fw/f3 is not less than or equal to the lower limit defined in Conditional Formula (1). As a result, correction of various aberrations in a lens system having a small F number, particularly spherical aberration and astigmatism, will be facilitated. In the case that the third lens L13 is a positive lens, the positive refractive power of the third lens L13 can be prevented from becoming excessively strong by configuring the projection zoom lens such that the value of fw/f3 is not greater than or equal to the upper limit defined in Conditional Formula (1). As a result, the first lens group G1 can have an appropriate negative refractive power without increasing the negative refractive powers of the first lens L11 and the second lens L12, and configuring the lens system to be compact while securing an appropriate amount of back focus will be facilitated. In the case that the negative refractive powers of the first lens L11 and the second lens L12 are excessively strong, the diameter of the first lens L11 will become great, resulting in an increase in the total length of the lens system.

It is preferable for Conditional Formula (1-1) below to be satisfied, in order to cause the advantageous effects related to Conditional Formula (1) described above to become more prominent.

$$-0.050 < fw/f3 < 0.050 \tag{1-1}$$

In addition, in the projection zoom lens of the present embodiment, it is preferable for Conditional Formula (2) below to be satisfied.

$$-12.0 < fA/fw < -2.0 \tag{2}$$

wherein fw is the focal length of the entire projection zoom lens at the wide angle end, and fA is the focal length of an air lens formed by the lens surface of the second lens toward the reduction side and the lens surface of the third lens toward the magnification side. fA is obtained by the equation below.

$$\frac{1}{fA} = \left\{ \frac{1 - Nd2}{R12r} + \frac{Nd3 - 1}{R13f} - \frac{(1 - Nd2) \times (Nd3 - 1) \times D4}{R12r \times R13f} \right\} \times \frac{1}{Nd3}$$

wherein R12r is the paraxial radius of curvature of the lens surface of the second lens L12 toward the reduction side, R13f is the paraxial radius of curvature of the lens surface of the third lens L13 toward the magnification side, Nd2 is the refractive index of the second lens L12, Nd3 is the refractive index of the third lens L13, and D4 is the air distance between the second lens L12 and the third lens L13. Note that fA is a focal length within a space in which the refractive index is Nd3.

Conditional Formula (2) defines the ratio between the focal length of the air lens formed by the lens surface of the second lens toward the reduction side and the lens surface of the third lens toward the magnification side and the focal length of the entire projection zoom lens. The refractive power of the air lens can be secured by configuring the projection zoom lens such that the value of fA/fw is not less than or equal to the lower limit defined in Conditional Formula (2). As a result, a large amount of field curvature being generated at the peripheral portions of images can be prevented. The refractive power of the air lens can be suppressed by configuring the projection zoom lens such that the value of fA/fw is not greater than or equal to the upper limit defined in Conditional Formula (2). As a result, the air distance between the second lens L12 and the third lens L13 can be decreased, which contributes to miniaturization of the lens system.

It is preferable for Conditional Formula (2-1) below to be satisfied, in order to cause the advantageous effects related to Conditional Formula (2) described above to become more prominent.

$$-10.0 < fA/fw < -3.0 \tag{2-1}$$

In addition, it is preferable for Conditional Formula (3) below to be satisfied.

$$65.0 < vd2 < 96.0 \tag{3}$$

wherein vd2 is the Abbe's number of the second lens with respect to the d line.

Conditional Formula (3) defines the Abbe's number of the material of the second lens L12. It will become possible to favorably correct lateral chromatic aberration by configuring the projection zoom lens such that the value of vd2 is not less than or equal to the lower limit defined in Conditional Formula (3). Production of the lens using existing optical materials will be facilitated by configuring the projection zoom lens such that the value of vd2 is not greater than or equal to the upper limit defined in Conditional Formula (3).

In addition, it is preferable for Conditional Formula (4) to be satisfied.

$$1.0 < Bf/fw < 2.0 \tag{4}$$

wherein fw is the focal length of the entire projection zoom lens at the wide angle end, and Bf is the back focus of the entire projection zoom lens at the wide angle end in the case that the reduction side is designated as the back side, as an air converted length.

Conditional Formula (4) defines the ratio between the back focus of the projection zoom lens and the focal length of the entire projection zoom lens. A sufficient amount of back focus which is necessary for a space to provide a color combining prism or the like at the reduction side of the projection zoom lens can be secured, by configuring the projection zoom lens such that the value of Bf/fw is not less than or equal to the lower limit defined in Conditional Formula (4). An increase in the total length of the lens system and the diameter of the lens can be suppressed, by configuring the projection zoom lens such that the value of Bf/fw is not greater than or equal to the upper limit defined in Conditional Formula (4). As a result, miniaturization can be achieved.

In the case that the projection zoom lens is constituted by five lens groups having a power arrangement of negative, positive, positive, positive, and positive in order from the magnification side to the reduction side, the first lens group G1 and the fifth lens group G5 are fixed when changing magnification, and the second lens group G2 through the fourth lens group G4 move when changing magnification, it is preferable for at least one of Conditional Formulae (5) and (6) below to be satisfied.

$$2.0 < fG3/fw < 4.5 \tag{5}$$

$$1.5 < fG5/fw < 4.0 \tag{6}$$

wherein fw is the focal length of the entire projection zoom lens at the wide angle end, fG3 is the focal length of the third lens group, and fG5 is the focal length of the fifth lens group.

Conditional Formula (5) defines the ratio between the focal length of the third lens group G3 and the focal length of the entire projection zoom lens. Correction of astigmatism when changing magnification will be facilitated by configuring the projection zoom lens such that the value of fG3/fw is not less than or equal to the lower limit defined in Conditional Formula (5). The amount of movement of the third lens group G3 when changing magnification can be suppressed by configuring the projection zoom lens such that the value of fG3/fw is not greater than or equal to the upper limit defined in Conditional Formula (5). As a result, an increase in the size of the lens system can be prevented.

Conditional Formula (6) defines the ratio between the focal length of the fifth lens group G5 and the focal length of the entire projection zoom lens. Correction of lateral chromatic aberration will be facilitated by configuring the projection zoom lens such that the value of fG5/fw is not less than or equal to the lower limit defined in Conditional Formula (6). The back focus can be prevented from becoming longer than necessary by configuring the projection zoom lens such that the value of fG5/fw is not greater than or equal to the upper limit defined in Conditional Formula (6). As a result, an increase in the size of the lens system can be prevented.

In the case that the projection zoom lens is constituted by five lens groups having a power arrangement of negative, positive, positive, positive, and positive in order from the magnification side to the reduction side, the first lens group G1 and the fifth lens group G5 are fixed when changing magnification, the second lens group G2 through the fourth lens group G4 move when changing magnification, and the lens provided most toward the magnification side within the fourth lens group G4 is a negative lens, it is preferable for Conditional Formula (7) below to be satisfied.

$$1.0 < (R41f + R41r)/(R41f - R41r) < 4.0 \quad (7)$$

wherein R41f is the paraxial radius of curvature of the surface toward the magnification side of the lens provided most toward the magnification side within the fourth lens group, and R41r is the paraxial radius of curvature of the surface toward the reduction side of the lens provided most toward the magnification side within the fourth lens group.

Conditional Formula (7) defines the shape of the lens provided most toward the magnification side within the fourth lens group G4. It will become possible to favorably correct spherical aberration and astigmatism, which are likely to become problems in an optical system having a small F number, by configuring the projection zoom lens such that the value of (R41f+R41r)/(R41f-R41r) is not less than or equal to the lower limit defined in Conditional Formula (7) and also not greater than or equal to the upper limit defined in Conditional Formula (7).

More specifically, the second lens group G2 through the fifth lens group G5 of the projection zoom lens of the present embodiment may have the configurations described below, as in the example illustrated in FIG. 1. The second lens group G2 may be constituted by three lenses, which are, in order from the magnification side to the reduction side, a biconvex lens L21, a biconvex lens L22, and a biconcave lens L23. The third lens group G3 may be constituted only by a biconvex lens L31. The fourth lens group G4 may be constituted by four lenses, which are, in order from the magnification side to the reduction side, a lens L41, which is an aspherical lens having a negative refractive power and is of a meniscus shape having a concave surface toward the reduction side in the paraxial region, a biconcave lens L42, a biconvex lens L43, and a biconvex lens L44. The fifth lens group G5 may be constituted by only a biconvex lens L51.

Note that it is possible to adopt arbitrary combinations of the preferable configurations and the possible configurations described above. It is preferable for the configurations described above to be selectively adopted as appropriate, according to items desired of the projection zoom lens.

The embodiments of the present disclosure may be applied to projection zoom lenses having an F number less than 1.6 at the wide angle end, for example.

Next, specific examples of the projection zoom lens of the present disclosure will be described. Note that the numerical value data of the examples to be indicated hereinbelow are those which are normalized such that the focal length of the entire lens system at the wide angle end when the projection distance is infinity will be 1.00, and are rounded off at a predetermined number of digits.

Example 1

The lens configuration of a projection zoom lens of Example 1 is illustrated in FIG. 1. Because a description has already been given regarding FIG. 1, redundant descriptions will be omitted here. Numerical value data that indicate the detailed configuration of the projection zoom lens of Example 1 are shown in Table 1 through Table 3. Table 1 shows basic lens data, Table 2 shows aspherical surface coefficients, and Table 3 shows items related to the d line as well as the values of variable distances among surfaces.

In Table 1, ith (i=1, 2, 3, . . . ) surface numbers that sequentially increase from the magnification side to the reduction side, with the surface toward the magnification side of the constituent element at the most magnification side designated as first, are shown in the column Si. The radii of curvature of ith surfaces are shown in the column Ri, the distances between an ith surface and an i+1st surface along the optical axis Z are shown in the column Di. The refractive indices of jth (j=1, 2, 3, . . . ) constituent elements that sequentially increase from the magnification side to the reduction side, with the constituent element at the most magnification side designated as first, with respect to the d line (wavelength: 587.6 nm) are shown in the column Ndj. The Abbe's numbers of jth constituent elements with respect to the d line are shown in the column vdj.

Note that the signs of the radii of curvature are positive in cases that the surface shape is convex toward the magnification side, and negative in cases that the surface shape is convex toward the reduction side. The glass block 2 is also shown in the basic lens data of Table 1. An "*" is indicated along with the surface numbers of aspherical surfaces, and numerical values related to the paraxial radii of curvature are shown in the column that shows the radii of curvature for the aspherical surfaces.

Table 2 shows the aspherical surface coefficients of each aspherical surface of Example 1. In the numerical values shown as the aspherical surface data, the symbol "E−n" (n is an integer) means ".10$^{-n}$". The aspherical surface coefficients are the coefficients KA and Am (m is an integer 3 or greater, and differs for each aspherical surface) represented by the aspherical surface shape formula below.

$$Zd = \frac{C \times h^2}{1 + \sqrt{1 - KA \times C^2 \times h^2}} + \sum_m Am \times h^m$$

wherein: Zd is the depth of the aspherical surface (the length of a normal line from a point on an aspherical surface at a height h to a plane perpendicular to the optical axis that contacts the peak of the aspherical surface), h is the height (the distance from the optical axis to the surface of the lens), C is the paraxial curvature, and KA and Am are aspherical surface coefficients.

In Table 1, the variable distances between surfaces are represented by the notation "DD[ ]". The surface number toward the magnification side is shown in the brackets [ ], and written in the column Di. DD[6], DD[11], DD[13], and DD[20] respectively correspond to the distance between the first lens group G1 and the second lens group G2, the distance between the second lens group G2 and the third lens group G3, the distance between the third lens group G3 and the fourth lens group G4, and the distance between the fourth lens group G4 and the fifth lens group G5. All of the distances DD[6], DD[11], DD[13], and DD[20] change when changing magnification. DD[6] is a variable distance between surfaces that also changes during focusing operations.

The upper portion of Table 3 shows the values of the focal length f of the entire system, the back focus Bf' in the case that the reduction side is designated as the back side as an air converted distance, the F number FNo., the full angle of view 2ω (units are degrees) and the aforementioned variable distances between surfaces in the case that the projection distance is infinity. Table 3 shows the above values at the wide angle end, an intermediate focal point distance, and at the telephoto end under the columns WIDE, MIDDLE, and TELE, respectively. The lower portion of Table 3 shows the values of DD[6] at the wide angle end, the intermediate focal point distance, and at the telephoto end in the case that the projection distance is 88.118. Note that the values shown in Table 3 are related to the d line. Here, the projection distance is the distance from the surface of the projection zoom lens most toward the magnification side to a projection surface (screen).

TABLE 1

Example 1

| Si | Ri | Di | Ndj | vdj |
|---|---|---|---|---|
| 1 | 2.2202 | 0.0783 | 1.62299 | 58.12 |
| 2 | 0.9442 | 0.5033 | | |
| 3 | −2.8876 | 0.0661 | 1.49700 | 81.61 |
| 4 | 2.1235 | 0.1356 | | |
| *5 | 18.2662 | 0.1713 | 1.53158 | 55.08 |
| *6 | −51.8224 | DD[6] | | |
| 7 | 3.5354 | 0.2355 | 1.80610 | 33.27 |
| 8 | −5.7521 | 0.0098 | | |
| 9 | 2.3895 | 0.4181 | 1.83400 | 37.16 |
| 10 | −1.7168 | 0.0661 | 1.80518 | 25.42 |
| 11 | 9.3623 | DD[11] | | |
| 12 | 1.7021 | 0.1606 | 1.48749 | 70.44 |
| 13 | −10.2828 | DD[13] | | |
| *14 | 4.6877 | 0.0636 | 1.68893 | 31.08 |
| *15 | 1.0666 | 0.2976 | | |
| 16 | −0.7477 | 0.0519 | 1.74077 | 27.79 |
| 17 | 3.5860 | 0.3304 | 1.49700 | 81.61 |
| 18 | −0.9872 | 0.0098 | | |
| 19 | 45.1162 | 0.3118 | 1.71700 | 47.93 |
| 20 | −1.3328 | DD[20] | | |
| 21 | 3.8792 | 0.2085 | 1.83481 | 42.72 |
| 22 | −5.2105 | 0.3967 | | |
| 23 | ∞ | 1.4107 | 1.51633 | 64.14 |
| 24 | ∞ | | | |

TABLE 2

Example 1

| Surface Number | 5 | 6 |
|---|---|---|
| KA | 1.0000000E+00 | 1.0000000E+00 |
| A3 | 3.3816672E−03 | 7.3593434E−03 |
| A4 | 2.3045639E−01 | 1.3462782E−01 |
| A5 | −7.5055326E−02 | −1.7301691E−01 |
| A6 | 2.8479138E−01 | −1.9597633E−01 |
| A7 | −5.8383875E+00 | 7.2636260E+00 |
| A8 | 4.4903549E+01 | −4.5426413E+01 |
| A9 | −1.9316556E+02 | 1.6645795E+02 |
| A10 | 5.4538148E+02 | −4.2693156E+02 |
| A11 | −1.0878443E+03 | 8.0270043E+02 |
| A12 | 1.5695423E+03 | −1.1003679E+03 |
| A13 | −1.6142971E+03 | 1.0598266E+03 |
| A14 | 1.1189478E+03 | −6.7344018E+02 |
| A15 | −4.6348912E+02 | 2.5299006E+02 |
| A16 | 8.5442528E+01 | −4.2907938E+01 |

| Surface Number | 14 | 15 |
|---|---|---|
| KA | 1.0000000E+00 | 1.0000000E+00 |
| A3 | 0.0000000E+00 | 0.0000000E+00 |
| A4 | 6.9248565E−02 | 2.2209880E−01 |
| A5 | −2.8275927E−02 | 3.3733114E−01 |
| A6 | −3.3399130E+00 | −3.9261172E+00 |
| A7 | 1.7465848E+00 | −4.5594800E−01 |
| A8 | 8.3781416E+00 | 1.2994305E+01 |
| A9 | −5.7857765E+00 | −9.0275389E−01 |
| A10 | −4.9916561E+00 | −1.7301359E+01 |

TABLE 3

Example 1

| | WIDE | MIDDLE | TELE |
|---|---|---|---|
| | Projection Distance = ∞ | | |
| f | 1.00 | 1.13 | 1.20 |
| Bf' | 1.33 | 1.33 | 1.33 |
| FNo. | 1.51 | 1.62 | 1.71 |
| 2ω[°] | 57.6 | 51.2 | 48.4 |
| DD[6] | 0.3582 | 0.1810 | 0.1040 |
| DD[11] | 0.8111 | 0.6681 | 0.5827 |
| DD[13] | 0.0866 | 0.2642 | 0.3573 |
| DD[20] | 0.0223 | 0.1650 | 0.2342 |
| | Projection Distance = 88.118 | | |
| DD[6] | 0.3756 | 0.1984 | 0.1214 |

Figure 4:
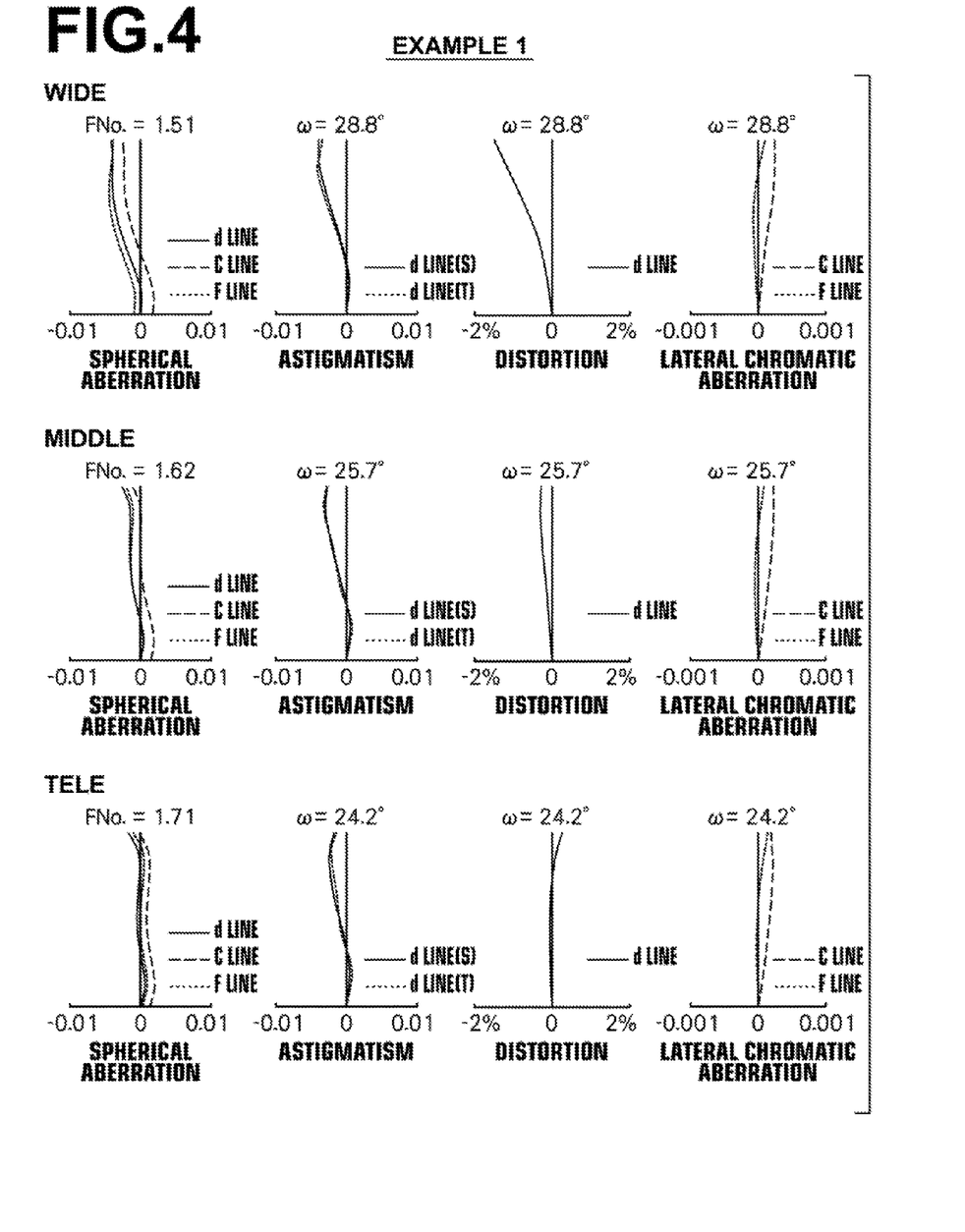
FIG. 4 is a collection of diagrams that illustrate various aberrations of the projection zoom lens of Example 1, wherein the diagrams are those that illustrate spherical aberration, astigmatism, distortion, and lateral chromatic aberration in order from the left side to the right side of the drawing sheet.

The spherical aberration, the astigmatism, the distortion, the lateral chromatic aberration (chromatic aberration of magnification rates) for a case in which the projection distance is 88.118 are illustrated in aberration diagrams in order from the left to the right of FIG. 4. Aberrations in a state in which the projection zoom lens is at the wide angle end are illustrated in the upper portion of FIG. 4 labeled WIDE, aberrations in a state in which the projection zoom lens is at an intermediate focal point distance are illustrated in the middle portion of FIG. 4 labeled MIDDLE, and aberrations in a state in which the projection zoom lens is at the telephoto end are illustrated in the lower portion of FIG. 4 labeled TELE. In the diagrams that illustrate spherical aberration in FIG. 4, aberrations related to the d line (wavelength: 587.6 nm), the C line (wavelength: 656.3 nm), and the F line (wavelength: 486.1 nm) are indicated by a solid line, a long broken line, and a short broken line, respectively. In the diagrams that illustrate astigmatism, aberrations related to the d line in the sagittal direction and the tangential direction are indicated by a solid line and a broken line, respectively. In the diagrams that illustrate distortion, aberration related to the d line is indicated by a solid line. In the diagrams that illustrate lateral chromatic aberration, aberrations related to the C line and the F line are indicated by a long broken line and a short broken line, respectively. In the diagrams that illustrate spherical aberration, "FNo." denotes F numbers, and in the diagrams that illustrate other aberrations, "ω" denotes half angles of view.

The symbols, the meanings, and the manners in which the various pieces of data are described in the description of Example 1 above are the same for the examples to be described below unless otherwise noted. Therefore, redundant portions will be omitted from the following descriptions of the other examples.

Example 2

Figure 5:
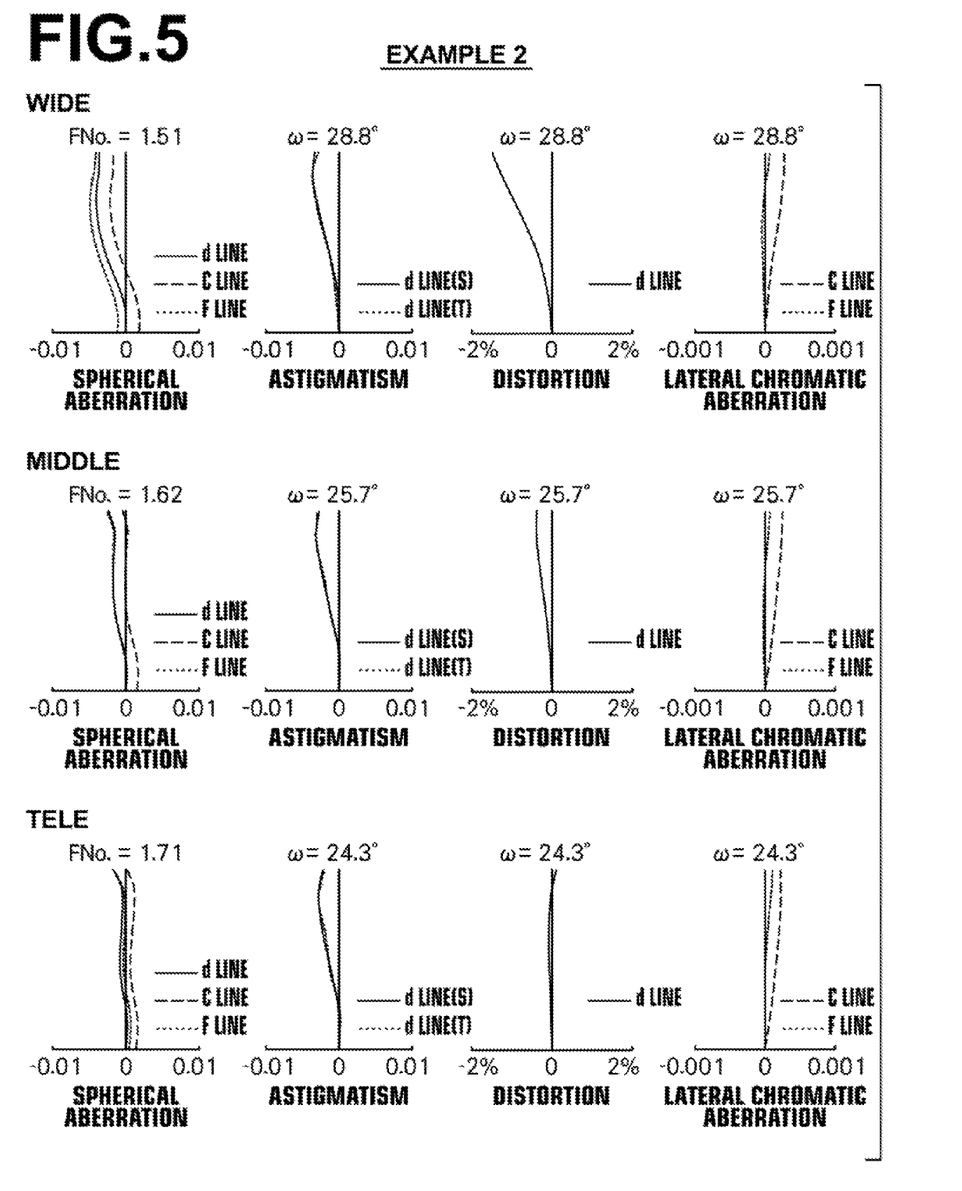
FIG. 5 is a collection of diagrams that illustrate various aberrations of the projection zoom lens of Example 2, wherein the diagrams are those that illustrate spherical aberration, astigmatism, distortion, and lateral chromatic aberration in order from the left side to the right side of the drawing sheet.

The lens configuration of the projection zoom lens of Example 2 is illustrated in FIG. 2. Basic lens data are shown in Table 4, aspherical surface coefficients are shown in Table 5, and the values of various items and the variable distances between surfaces are shown in Table 6 for the projection zoom lens of Example 2. The value of DD[6] shown in the lower portion of Table 6 is that for a case in which the projection distance is 88.132. The spherical aberration, the astigmatism, the distortion, the lateral chromatic aberration of the projection zoom lens of Example 2 for a case in which the projection distance is 88.132 are illustrated in aberration diagrams in order from the left to the right of FIG. 5.

TABLE 4

Example 2

| Si | Ri | Di | Ndj | vdj |
|---|---|---|---|---|
| 1 | 2.3234 | 0.0783 | 1.62041 | 60.29 |
| 2 | 0.9509 | 0.4251 | | |
| 3 | −8.0013 | 0.0661 | 1.59282 | 68.62 |
| 4 | 2.0865 | 0.2193 | | |
| *5 | −147.9776 | 0.1959 | 1.49100 | 57.58 |
| *6 | −83.8006 | DD[6] | | |
| 7 | 3.7956 | 0.2235 | 1.80610 | 33.27 |
| 8 | −6.6926 | 0.0098 | | |
| 9 | 2.4936 | 0.4451 | 1.83400 | 37.16 |
| 10 | −1.6086 | 0.0686 | 1.80518 | 25.42 |
| 11 | 36.6507 | DD[11] | | |
| 12 | 1.8733 | 0.1467 | 1.48749 | 70.24 |
| 13 | −14.9314 | DD[13] | | |
| *14 | 1.4478 | 0.0637 | 1.68893 | 31.08 |
| *15 | 0.7004 | 0.3103 | | |
| 16 | −0.7713 | 0.0543 | 1.72825 | 28.46 |
| 17 | 3.5202 | 0.3290 | 1.49700 | 81.61 |
| 18 | −1.0437 | 0.0098 | | |
| 19 | 103.2140 | 0.3004 | 1.77250 | 49.60 |
| 20 | −1.3762 | DD[20] | | |
| 21 | 4.7994 | 0.2084 | 1.81600 | 46.62 |
| 22 | −4.1680 | 0.3967 | | |
| 23 | ∞ | 1.4109 | 1.51633 | 64.14 |
| 24 | ∞ | | | |

TABLE 5

Example 2

| Surface Number | 5 | 6 |
|---|---|---|
| KA | 2.7766105E+02 | 1.0131004E+04 |
| A3 | 2.9447957E−16 | −3.5348924E−15 |
| A4 | 9.1188312E−02 | 6.9008353E−02 |
| A5 | −9.4291604E−02 | −6.9166663E−01 |
| A6 | −1.0705278E+00 | 2.1181584E+00 |
| A7 | 6.7094318E+00 | 7.5413885E−02 |
| A8 | −1.5104313E+01 | −2.0689618E+01 |
| A9 | 1.0153414E+01 | 6.5603710E+01 |
| A10 | −8.1180801E−01 | −1.0643980E+02 |
| A11 | 4.2626119E+01 | 1.1014419E+02 |
| A12 | −9.5946562E+01 | −6.9851718E+01 |
| A13 | 1.3202650E+01 | −2.0521907E+01 |
| A14 | 1.3383724E+02 | 1.1167891E+02 |
| A15 | −1.2986870E+02 | −1.0525177E+02 |
| A16 | 3.5608836E+01 | 3.3532812E+01 |

| Surface Number | 14 | 15 |
|---|---|---|
| KA | 1.0000000E+00 | 1.0000000E+00 |
| A4 | −1.5631807E+00 | −1.6758674E+00 |
| A6 | 4.1149346E+00 | 4.4512239E+00 |
| A8 | −1.2564298E+01 | −1.6062898E+01 |
| A10 | 1.8119574E+01 | 2.2510012E+01 |

TABLE 6

Example 2

| | WIDE | MIDDLE | TELE |
|---|---|---|---|
| | Projection Distance = ∞ | | |
| f | 1.00 | 1.13 | 1.20 |
| Bf | 1.33 | 1.33 | 1.33 |
| FNo. | 1.51 | 1.62 | 1.71 |
| 2ω[°] | 57.6 | 51.4 | 48.4 |
| DD[6] | 0.3316 | 0.1487 | 0.0686 |
| DD[11] | 0.8367 | 0.6828 | 0.5884 |
| DD[13] | 0.0515 | 0.2428 | 0.3438 |
| DD[20] | 0.0221 | 0.1676 | 0.2411 |
| | Projection Distance = 88.132 | | |
| DD[6] | 0.3495 | 0.1666 | 0.0865 |

Example 3

Figure 6:
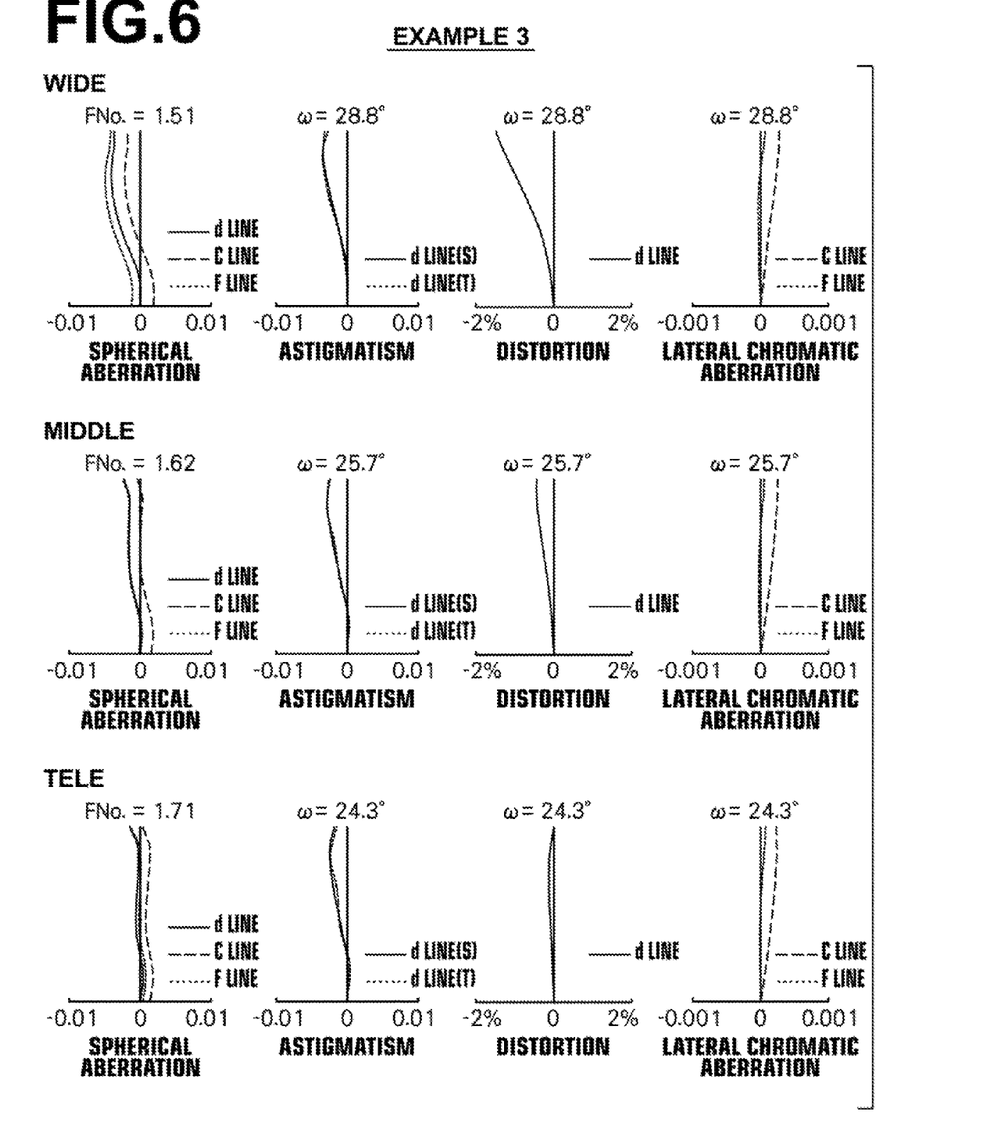
FIG. 6 is a collection of diagrams that illustrate various aberrations of the projection zoom lens of Example 3, wherein the diagrams are those that illustrate spherical aberration, astigmatism, distortion, and lateral chromatic aberration in order from the left side to the right side of the drawing sheet.

The lens configuration of the projection zoom lens of Example 3 is illustrated in FIG. 3. Basic lens data are shown in Table 7, aspherical surface coefficients are shown in Table 8, and the values of various items and the variable distances between surfaces are shown in Table 9 for the projection zoom lens of Example 3. The value of DD[6] shown in the lower portion of Table 6 is that for a case in which the projection distance is 88.113. The spherical aberration, the astigmatism, the distortion, the lateral chromatic aberration of the projection zoom lens of Example 3 for a case in which the projection distance is 88.113 are illustrated in aberration diagrams in order from the left to the right of FIG. 6.

TABLE 7

Example 3

| Si | Ri | Di | Ndj | vdj |
|---|---|---|---|---|
| 1 | 2.1975 | 0.0783 | 1.62299 | 58.16 |
| 2 | 0.9348 | 0.4395 | | |
| 3 | −7.7612 | 0.0660 | 1.49700 | 81.61 |
| 4 | 1.8937 | 0.2395 | | |
| *5 | −17.9849 | 0.1560 | 1.49100 | 57.58 |
| *6 | −171.5944 | DD[6] | | |
| 7 | 4.1037 | 0.2109 | 1.80610 | 33.27 |
| 8 | −7.4694 | 0.0098 | | |
| 9 | 2.4263 | 0.4501 | 1.83400 | 37.16 |
| 10 | −1.6022 | 0.0685 | 1.80518 | 25.42 |
| 11 | 121.0502 | DD[11] | | |

TABLE 7-continued

Example 3

| Si | Ri | Di | Ndj | vdj |
|---|---|---|---|---|
| 12 | 1.7765 | 0.1504 | 1.48749 | 70.24 |
| 13 | −17.0056 | DD[13] | | |
| *14 | 1.3990 | 0.0637 | 1.68893 | 31.08 |
| *15 | 0.6822 | 0.3228 | | |
| 16 | −0.7893 | 0.0543 | 1.72825 | 28.46 |
| 17 | 3.5690 | 0.3241 | 1.49700 | 81.61 |
| 18 | −1.0635 | 0.0098 | | |
| 19 | 128.9657 | 0.2999 | 1.77250 | 49.60 |
| 20 | −1.3701 | DD[20] | | |
| 21 | 4.6732 | 0.2112 | 1.80400 | 46.58 |
| 22 | −4.1682 | 0.3967 | | |
| 23 | ∞ | 1.4106 | 1.51633 | 64.14 |
| 24 | ∞ | | | |

TABLE 8

Example 3

| Surface Number | 5 | 6 |
|---|---|---|
| KA | −3.3611973E+02 | 4.2490500E+04 |
| A3 | 1.2963606E−15 | 6.0986115E−16 |
| A4 | 1.3224380E−01 | 1.2202871E−01 |
| A5 | −2.4177805E−01 | −1.0192507E+00 |
| A6 | −1.2486484E+00 | 2.8819778E+00 |
| A7 | 9.2616621E+00 | 8.5319650E−01 |
| A8 | −2.0723360E+01 | −2.9431851E+01 |
| A9 | 1.0865420E+01 | 8.7510500E+01 |
| A10 | 3.9272926E+00 | −1.4072691E+02 |
| A11 | 6.4657407E+01 | 1.5732756E+02 |
| A12 | −1.5000771E+02 | −1.1506275E+02 |
| A13 | 1.7259167E+01 | −2.8270900E+01 |
| A14 | 2.1683576E+02 | 1.8576997E+02 |
| A15 | −2.0930027E+02 | −1.7485405E+02 |
| A16 | 5.7474366E+01 | 5.4470982E+01 |

| Surface Number | 14 | 15 |
|---|---|---|
| KA | 1.0000000E+00 | 1.0000000E+00 |
| A4 | −1.6735006E+00 | −1.8178490E+00 |
| A6 | 4.6336068E+00 | 4.9873844E+00 |
| A8 | −1.4149977E+01 | −1.8005980E+01 |
| A10 | 2.0283165E+01 | 2.4756492E+01 |

TABLE 9

Example 3

| | WIDE | MIDDLE | TELE |
|---|---|---|---|
| | Projection Distance = ∞ | | |
| F | 1.00 | 1.13 | 1.20 |
| Bf | 1.33 | 1.33 | 1.33 |
| FNo. | 1.51 | 1.62 | 1.72 |
| 2ω[°] | 57.6 | 51.4 | 48.6 |
| DD[6] | 0.3320 | 0.1485 | 0.0679 |
| DD[11] | 0.8339 | 0.6819 | 0.5874 |
| DD[13] | 0.0519 | 0.2348 | 0.3309 |
| DD[20] | 0.0223 | 0.1749 | 0.2539 |
| | Projection Distance = 88.113 | | |
| DD[6] | 0.35 | 0.1665 | 0.086 |

The upper portion of Table 10 shows values corresponding to Conditional Formulae (1) through (7) for Examples 1 through 3 above. The lower portion of Table 10 shows values related to the conditional formulae and the focal lengths of each of the first lens group G1 through the fifth lens group G5 for Examples 1 through 3, denoted as fG1 through fG5. The values shown in Table 10 are related to the d line.

TABLE 10

| Formula | | Example 1 | Example 2 | Example 3 |
|---|---|---|---|---|
| (1) | fw/f3 | 0.039 | 0.003 | −0.024 |
| (2) | fA/fw | −7.5 | −5.2 | −5.1 |
| (3) | vd2 | 81.6 | 68.6 | 81.6 |
| (4) | Bf/fw | 1.3 | 1.3 | 1.3 |
| (5) | fG3/fw | 3.0 | 3.4 | 3.3 |
| (6) | fG5/fw | 2.7 | 2.8 | 2.8 |
| (7) | $\frac{R41f + R41r}{R41f - R41r}$ | 1.6 | 2.9 | 2.9 |

| | Example 1 | Example 2 | Example 3 |
|---|---|---|---|
| fw | 1.0 | 1.0 | 1.0 |
| fG1 | −1.3 | −1.3 | −1.3 |
| fG2 | 1.5 | 1.5 | 1.5 |
| fG3 | 3.0 | 3.4 | 3.3 |
| fG4 | 23.9 | 15.6 | 16.0 |
| fG5 | 2.7 | 2.8 | 2.8 |
| Bf | 1.3 | 1.3 | 1.3 |
| f3 | 25.4 | 393.1 | −40.9 |
| fA | −7.5 | −5.2 | −5.1 |
| vd2 | 81.6 | 68.6 | 81.6 |
| R41f | 4.6877 | 1.4478 | 1.3990 |
| R41r | 1.0666 | 0.7004 | 0.6822 |

As can be understood from the data above, each of the projection zoom lenses of Examples 1 through 3 has an F number of 1.51 at the wide angle end, is configured to be compact, has a back focus sufficiently long to enable insertion of a prism or the like, are configured such that the reduction side is telecentric, favorably corrects various aberrations, and realizes high optical performance.

Figure 7:
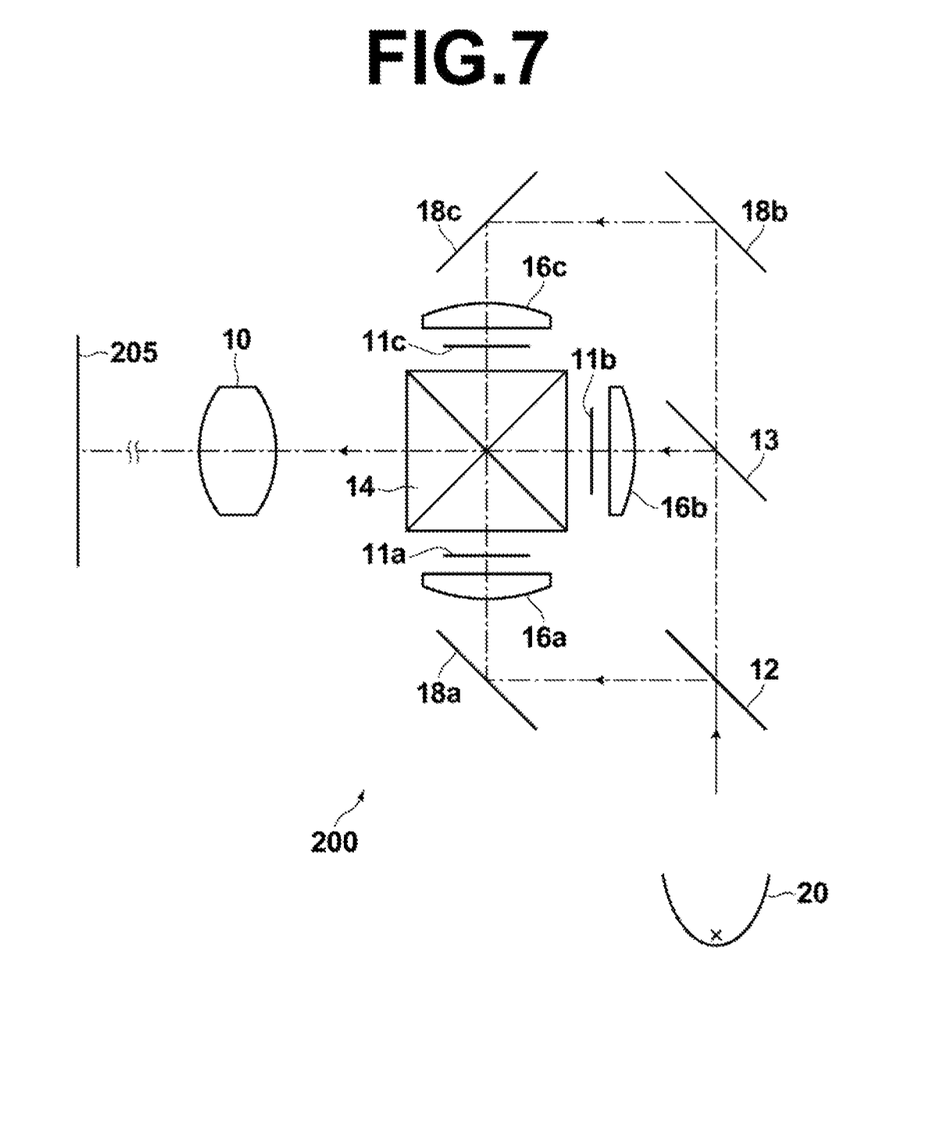
FIG. 7 is a diagram that illustrates the schematic configuration of a projection type display device according to an embodiment of the present disclosure.

Next, an embodiment of a projection display device of the present disclosure will be described with reference to FIG. 7. FIG. 7 is a diagram that illustrates the schematic configuration of a projection type display device according to an embodiment of the present disclosure. The projection type display device 200 illustrated in FIG. 17 is equipped with: a projection zoom lens 10 according to an embodiment of the present disclosure; a light source 20; transmissive display elements 11a through 11c that function as light valves each corresponding to a colored light beam; dichroic mirrors 12 and 13 for separating colors; a cross dichroic prism 14 for combining colors; condenser lenses 16a through 16c; and total reflection mirrors 18a through 18c for deflecting optical paths. Note that the projection zoom lens 10 is schematically illustrated in FIG. 7. In addition, although not illustrated in FIG. 7, an integrator is provided between the light source 20 and the dichroic mirror 12.

White light output by the light source 20 is separated into three colored light beams (G light, B light, and R light) by the dichroic mirrors 12 and 13. The colored light beams enters the transmissive display elements 11a through 11c corresponding thereto via the condenser lenses 16a through 16c and are optically modulated. After the colors are combined by the cross dichroic prism 14, the combined light beam enters the projection zoom lens 10. The projection zoom lens 10 projects an optical image formed by light which has been optically modulated by the transmissive display elements 11a through 11c onto a screen 205.

Embodiments and Examples of the present disclosure have been described above. However, the projection zoom lens of the present disclosure is not limited to the Examples described above, and various modifications to the aspects of the projection zoom lens are possible. For example, the radii of curvature, the distances among surfaces, the refractive indices, the Abbe's numbers, and the aspherical surface coefficients of the lenses may be changed as appropriate.

In addition, the projection type display device of the present disclosure is not limited to that having the configuration described above. For example, the light valves to be employed and the optical members to be employed to separate or combine light beams are not limited to the configurations described above, and various changes to these aspects are possible.

What is claimed is:

1. A projection zoom lens, consisting of:
a plurality of lens groups that include at least two lens groups that move when changing magnification;
the distances among all pairs of adjacent lens groups changing when changing magnification;
the reduction side being configured to be telecentric;
a first lens group, which has a negative refractive power and is fixed when changing magnification, being provided most toward the magnification side;
the first lens group consisting of, in order from the magnification side to the reduction side, a first lens, which is a meniscus lens having a negative refractive power and a convex surface toward the magnification side, a second lens, which is a biconcave lens, and a third lens having one of a positive refractive power and a negative refractive power; and
Conditional Formula (1) below being satisfied:

$$-0.070 < fw/f3 < 0.070 \quad (1)$$

wherein fw is the focal length of the entire projection zoom lens at the wide angle end, and f3 is the focal length of the third lens.

2. A projection zoom lens as defined in claim 1, in which Conditional Formula (1-1) below is satisfied:

$$-0.050 < fw/f3 < 0.050 \quad (1\text{-}1)$$

3. A projection zoom lens as defined in claim 1, in which Conditional Formula (2) below is satisfied:

$$-12.0 < fA/fw < -2.0 \quad (2)$$

wherein fA is the focal length of an air lens formed by the lens surface of the second lens toward the reduction side and the lens surface of the third lens toward the magnification side.

4. A projection zoom lens as defined in claim 3, in which Conditional Formula (2-1) below is satisfied:

$$-10.0 < fA/fw < -3.0 \quad (2\text{-}1)$$

5. A projection zoom lens as defined in claim 1, in which Conditional Formula (3) below is satisfied:

$$65.0 < vd2 < 96.0 \quad (3)$$

wherein vd2 is the Abbe's number of the second lens with respect to the d line.

6. A projection zoom lens as defined in claim 1, in which Conditional Formula (4) is satisfied:

$$1.0 < Bf/fw < 2.0 \quad (4)$$

wherein Bf is the back focus of the entire projection zoom lens at the wide angle end in the case that the reduction side is designated as the back side, as an air converted distance.

7. A projection zoom lens as defined in claim 1, consisting of:
five lens groups, which are, in order from the magnification side to the reduction side, the first lens group, a second lens group, a third lens group, a fourth lens group, and a fifth lens group; wherein:
the second lens group, the third lens group, and the fourth lens group move when changing magnification, while the fifth lens group is fixed.

8. A projection zoom lens as defined in claim 7, wherein:
each of the second lens group, the third lens group, the fourth lens group, and the fifth has a positive refractive power.

9. A projection zoom lens as defined in claim 8, in which Conditional Formula (5) below is satisfied:

$$2.0 < fG3/fw < 4.5 \quad (5)$$

wherein fG3 is the focal length of the third lens group.

10. A projection zoom lens as defined in claim 8, in which Conditional Formula (6) below is satisfied:

$$1.5 < fG5/fw < 4.0 \quad (6)$$

wherein fG5 is the focal length of the fifth lens group.

11. A projection zoom lens as defined in claim 7, wherein:
the lens provided most toward the magnification side in the fourth lens group has a negative refractive power; and
Conditional Formula (7) below is satisfied:

$$1.0 < (R41f + R41r)/(R41f - R41r) < 4.0 \quad (7)$$

wherein R41f is the paraxial radius of curvature of the surface toward the magnification side of the lens provided most toward the magnification side within the fourth lens group, and R41r is the paraxial radius of curvature of the surface toward the reduction side of the lens provided most toward the magnification side within the fourth lens group.

12. A projection type display device, comprising:
a light source;
a light valve into which light from the light source enters; and
a projection zoom lens as defined in claim 1 as a projection zoom lens that projects an optical image formed by light, which is optically modulated by the light valve, onto a screen.

* * * * *